(No Model.)
W. H. WATTS.
OYSTER OR CLAM RAKE.
No. 578,175.  Patented Mar. 2, 1897.
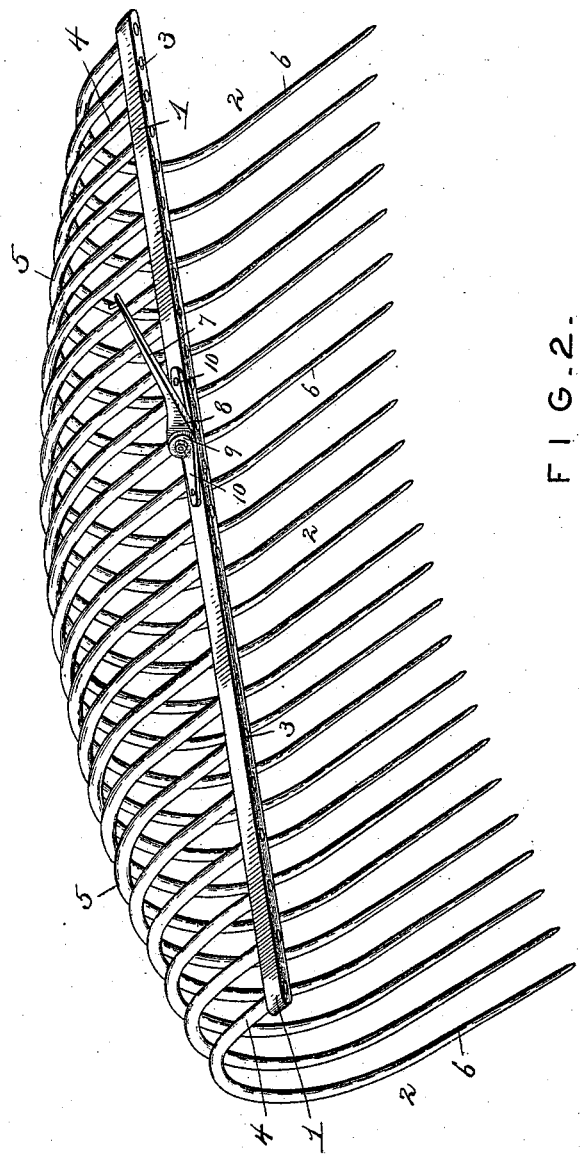
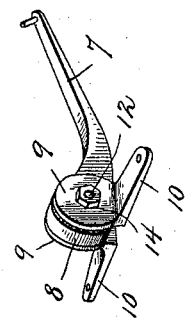
Witnesses
Harry L. Ames.
G. H. Maxwell.
Inventor
William H. Watts.
By his Attorneys,
C. A. Snow & Co.

UNITED STATES PATENT OFFICE.

WILLIAM H. WATTS, OF KEYPORT, NEW JERSEY.

OYSTER OR CLAM RAKE.

SPECIFICATION forming part of Letters Patent No. 578,175, dated March 2, 1897.

Application filed September 20, 1895. Serial No. 563,105. (No model.)

*To all whom it may concern:*

Be it known that I, WILLIAM H. WATTS, a citizen of the United States, residing at Keyport, in the county of Monmouth and State of New Jersey, have invented a new and useful Oyster or Clam Rake, of which the following is a specification.

My invention relates to oyster and clam rakes, and is particularly adapted to use with sailing craft or other vessels, the object being to provide an improved rake for dredging oysters and clams that is readily adjusted so as to vary the pitch of the teeth at will to suit varying weather, different kinds of bottom, and different depths of water, and that is formed so as to produce a rake that is strong, compact, and will gather in and retain a large load. In practice these rakes are attached by a short handle to a rope and thrown overboard from the vessel and allowed to drag at a distance of, say, ten to thirty fathoms, according to the depth of the water, and it is important that the rakes should have the proper pitch relative to the bottom and the proper shape to gather in and hold the hard clams or other bivalves with the greatest certainty and least danger and strain.

With the above objects in view, and to meet these requirements, I have invented the improved rake herein set forth, and more particularly defined in the claims.

In the drawings forming a part of this specification, Figure 1 is a perspective view of my invention; and Fig. 2 is a detail view, also in perspective, of the adjustable handle detached from the rake.

Referring now to the various parts by reference-numerals, 1 designates the head bar or frame, which may be made of wood or metal and is preferably malleable or wrought iron. To this head 1 a plurality of teeth 2 are fastened at 3 by welding, bolts, clamps, or other suitable means. From five to fifty or more teeth are employed, being spaced apart about an inch, more or less, so as to prevent the clams or oysters from falling through. The teeth 2 are straight for a short distance, as at 4, from the head, and are then bent, as at 5, in an approximately circular curve for a distance somewhat less than one hundred and eighty degrees, and then prolonged in a straight line, as at 6, tagential to said curve to a length so proportioned to the whole that the tendency under the normal pull will be to hold to the bottom without unduly digging thereinto and without tending to upset or dump the load. The straight terminal portions of the teeth collectively form a broad flat bottom or base, by which the rake is adapted to slide upon the bed of the stream without danger of the points of the teeth catching therein or the rake tilting and dumping its load. A broad flat receiving-surface for the oysters is also afforded, and as they collect at the rear portion of the rake they are thus enabled to assist in preventing the rake from tilting and the points of the teeth catching. The teeth are tapered toward their points and are all alike, with the exception that the straight portion 4 is slightly longer and the radius of curvature increases slightly in each successive tooth from the end toward the middle, the result being that the rake has a bowed or arched shape which aids in retaining the gathered mass and prevents the rush of water at the ends from sucking the same away, and that the pointed ends of said teeth rest on the ground in a rearwardly-curved line.

It is important, however, that as the winds vary in intensity so the pitch of the handle should be varied in order to maintain the proper pitch of the rake relatively to the bottom. To accomplish this quickly and readily, the adjustable handle 7 is provided. This handle is relatively short, but may have a wooden extension, and is provided at its outer end with means, as an eye, hook, or prong, for attaching the drag-rope. At the inner end the shank 8 of the handle is flattened out into circular form, so as to present a large bearing-surface on either side, and is adjusted between two clamping-ears 9, of corresponding shape and size and which present their inner faces parallel thereto and are firmly riveted, welded, or otherwise fastened by means of their lateral flanges 10 to the head-frame 1. A heavy bolt 12 is passed through alining eyes 13 in ears 9 and shank 8, which bolt is provided at one end with a nut or equivalent clamping means 14 for bringing the said ears 9 into immovable contact with the handle-shank 8. The adjacent surfaces of said shank and ears may be roughened or otherwise made more effective within the scope of my invention. From this description it is obvious that the pitch of the rack may be instantly changed with little effort simply by means of an ordinary wrench.

Various changes in the form, proportions, and details of construction of my improved rake may be made without departing from the limits of my invention.

What I claim, and desire to protect by Letters Patent, is—

1. An improved oyster-rake, comprising a suitable head, a plurality of teeth united rigidly thereto, each tooth being straight for a short distance from the rake-head, prolonged further in a curve substantially that of a semicircle, and terminating in a straight end portion tangential to said curve and in parallelism with its initial straight portion, the initial straight portion and also the radius of curvature increasing in length in each successive tooth from the ends toward the middle of the rake, and the points of said teeth alining in a rearwardly-bent curve, whereby a bowed or arched rake is formed which is adapted in conjunction with the pressure of the water to gather and retain its load with certainty, substantially as described.

2. An improved oyster-rake, comprising a suitable head, a plurality of teeth united rigidly thereto, each tooth being straight for a short distance from the rake-head, prolonged further in a curve substantially that of a semicircle, and terminating in a straight end portion tangential to said curve and in parallelism with its initial straight portion, the initial straight portion and also the radius of curvature increasing in length in each successive tooth from the ends toward the middle of the rake, and the points of said teeth alining in a rearwardly-bent curve, whereby a bowed or arched rake is formed which is adapted in conjunction with the pressure of the water to gather and retain its load with certainty, a handle connected pivotally to said rake-head, and a clamping device for holding said handle stationary at any desired angle, substantially as described.

In testimony that I claim the foregoing as my own I have hereto affixed my signature in the presence of two witnesses.

WILLIAM H. WATTS.

Witnesses:
JOSEPHINE A. OGDEN,
A. WALLING, Jr.